(12) United States Patent
Hotek et al.

(10) Patent No.: US 7,722,912 B2
(45) Date of Patent: May 25, 2010

(54) METHOD AND APPARATUS FOR MATERIAL HANDLING FOR A FOOD PRODUCT USING HIGH PRESSURE PASTEURIZATION

(75) Inventors: John P. Hotek, Austin, MN (US); Jeffrey J. Morrison, Austin, MN (US)

(73) Assignee: Hormel Foods Corporation, Austin, MN (US)

( * ) Notice: Subject to any disclaimer, the term of this patent is extended or adjusted under 35 U.S.C. 154(b) by 1205 days.

(21) Appl. No.: 11/129,897

(22) Filed: May 16, 2005

(65) Prior Publication Data

US 2006/0257552 A1    Nov. 16, 2006

(51) Int. Cl.
*A23B 4/005* (2006.01)
*A23L 3/00* (2006.01)
*A23L 3/10* (2006.01)
*A61L 2/00* (2006.01)
*A61L 9/00* (2006.01)

(52) U.S. Cl. .................. 426/665; 99/467; 422/295; 422/297; 426/399; 426/401; 426/407

(58) Field of Classification Search .......... 429/665; 426/665, 399, 401, 407; 99/467; 422/295, 422/297
See application file for complete search history.

(56) References Cited

U.S. PATENT DOCUMENTS

| | | | |
|---|---|---|---|
| 3,622,356 A * | 11/1971 | Long | 426/412 |
| 4,773,321 A * | 9/1988 | Wijts | 99/468 |
| 5,059,392 A | 10/1991 | Wijts | |
| 6,716,464 B1 | 4/2004 | Schlegel et al. | |
| 2003/0089578 A1 | 5/2003 | Roumagnac | |
| 2004/0045450 A1 | 3/2004 | Hernando | |

* cited by examiner

*Primary Examiner*—Brent T O'Hern
(74) *Attorney, Agent, or Firm*—IPLM Group, P.A.

(57) ABSTRACT

A method and apparatus for high-pressure pasteurization utilizes a basket (40) for holding food packages (95). The basket (40) is transported on a cart (60) from a loading station (90), to the high-pressure pasteurization processing apparatus (10) and back to an unloading station (100). Two robots (17, 18) are utilized to reduce cycle time of the high-pressure pasteurization vessels (11).

7 Claims, 9 Drawing Sheets

METHOD AND APPARATUS FOR MATERIAL HANDLING FOR A FOOD PRODUCT USING HIGH PRESSURE PASTEURIZATION

BACKGROUND OF THE INVENTION

1. Field of the Invention

This invention relates generally to high pressure pasteurization and more specifically to a method and apparatus for use while utilizing high pressure pasteurization for food products.

2. Description of the Prior Art

Consumers desire high quality, minimally processed foods with fresh characteristics and little to no additives. High pressure pasteurization ("HPP"), also known as high hydrostatic pressure processing or ultra-high pressure processing, is being used to pasteurize foods at elevated pressures of approximately 30,000 to 130,000 pounds per square inch ("psi") for a specified temperature and time. The pressure is applied through a pressure medium such as a liquid or a gas. Under these conditions, HPP has been found to be effective in inactivating many pathogenic microorganisms commonly found in foods. As compared to canned foods or pasteurized juices and milk, HPP significantly reduces the process temperature and time, which results in foods with improved characteristics such as better retention of freshness, flavor, texture, color, and nutrients.

HPP is based on the Le Chatelier principle which states that a system at equilibrium adjusts when subjected to a stress and that actions that have a net volume increase will be retarded and actions that have a net volume decrease will be enhanced. HPP utilizes isostatic or hydrostatic pressure which is equal from every direction. Isostatic compression transfers pressure instantly and uniformly throughout the pressure medium providing a non-thermal process alternative for the pasteurization of temperature-sensitive foods. Foods suspended in the pressure medium are assumed to follow the isostatic principle. The basis for using the HPP process as a pasteurization method is based on the assumption that the product also follows the isostatic rule, which states that isostatic pressure is instantly and uniformly transmitted throughout the pressurized medium and the enclosed food product, regardless of size, shape or physical state of the food.

During HPP, foods are subjected to pressures up to 130,000 psi, and the pressure destroys pathogenic microorganisms by interrupting their cellular functions. Within a living bacteria cell, many pressure sensitive processes such as protein function, enzyme action, and cellular membrane function are impacted by high pressure resulting in the inability of the bacteria to survive. Small macromolecules that are responsible for flavor, order, and nutrition are typically not changed by pressure.

HPP is gaining in popularity within the food industry because of its capacity to inactivate pathogenic microorganisms with little to no heat treatment, resulting in the retention of most of the nutritional and sensory characteristics of fresh foods without sacrificing shelf-life of the foods.

One of the advantages of HPP is that pressure transmission is relatively instantaneous and uniform, and HPP is not controlled by product size and is effective throughout the foods. HPP also offers several advantages over traditional thermal processing including reduced process times, minimal heat damage, and retention of freshness, flavor, texture, color, and nutrients.

To date, the process for HPP has been on a much smaller scale than is typically needed for processing large quantities of food. The present invention addresses this problem and provides for a new method and an apparatus for use during the high pressure pasteurization.

SUMMARY OF THE INVENTION

In one embodiment, the invention is a basket for holding product for use in high pressure pasteurization. The basket includes an elongate cylindrical body member. The body member has first and second ends and the body member defining an inner cavity. A dividing member is operatively connected to the body member, the dividing member separating the inner cavity into a first sub-chamber and a second sub-chamber. First and second end members are operatively connected proximate to the first and second ends of the body member. The end members having a circular surface extending radially outward further than the body member, thereby defining a circular surface for rotating the basket on a cart. The body member has a plurality of openings, wherein water may enter into the inner cavity. A door is operatively connected to the body member, wherein product is insertable into the inner cavity.

In another embodiment the invention is a method of processing a product for processing in a high pressure pasteurization vessel. The method includes positioning an elongate cylindrical basket on a movable cart, the basket being positioned in a horizontal position. The product is loaded inside of the basket while the basket is still in the horizontal position. The cart and basket are moved, while the basket is still in the horizontal position to the high pressure pasteurization apparatus. The baskets are then oriented vertically. The basket is loaded into the high pressure pasteurization vessel. The product is subjected to high pressure pasteurization. The basket is removed from the high pressure pasteurization vessel and the basket is oriented horizontally. The cart and basket are moved, while the basket is in a horizontal position to an unloading station. Product is unloaded from the basket while the basket is still in the horizontal position.

In another embodiment the invention is a method of processing product in a high pressure pasteurization vessel. The product is carried in a basket. The method includes positioning a gantry over at least a first high pressure pasteurization vessel. A first robot is carried on the gantry. A second robot is also carried on the gantry. A first basket is positioned for pickup by the first robot. The first basket is picked up by the first robot and placed in the at least first high pressure pasteurization vessel. The product is processed in the first basket in the at least first high pressure pasteurization vessel. The first basket is removed with the second robot. While the second robot is removing the first basket, a second basket is picked up with the first robot and the second basket is placed in the at least first high pressure pasteurization vessel, whereby cycle time is reduced in the at least first high pressure pasteurization vessel and is able to be utilized a greater percentage of time.

DETAILED DESCRIPTION OF A PREFERRED EMBODIMENT

Figure 1:
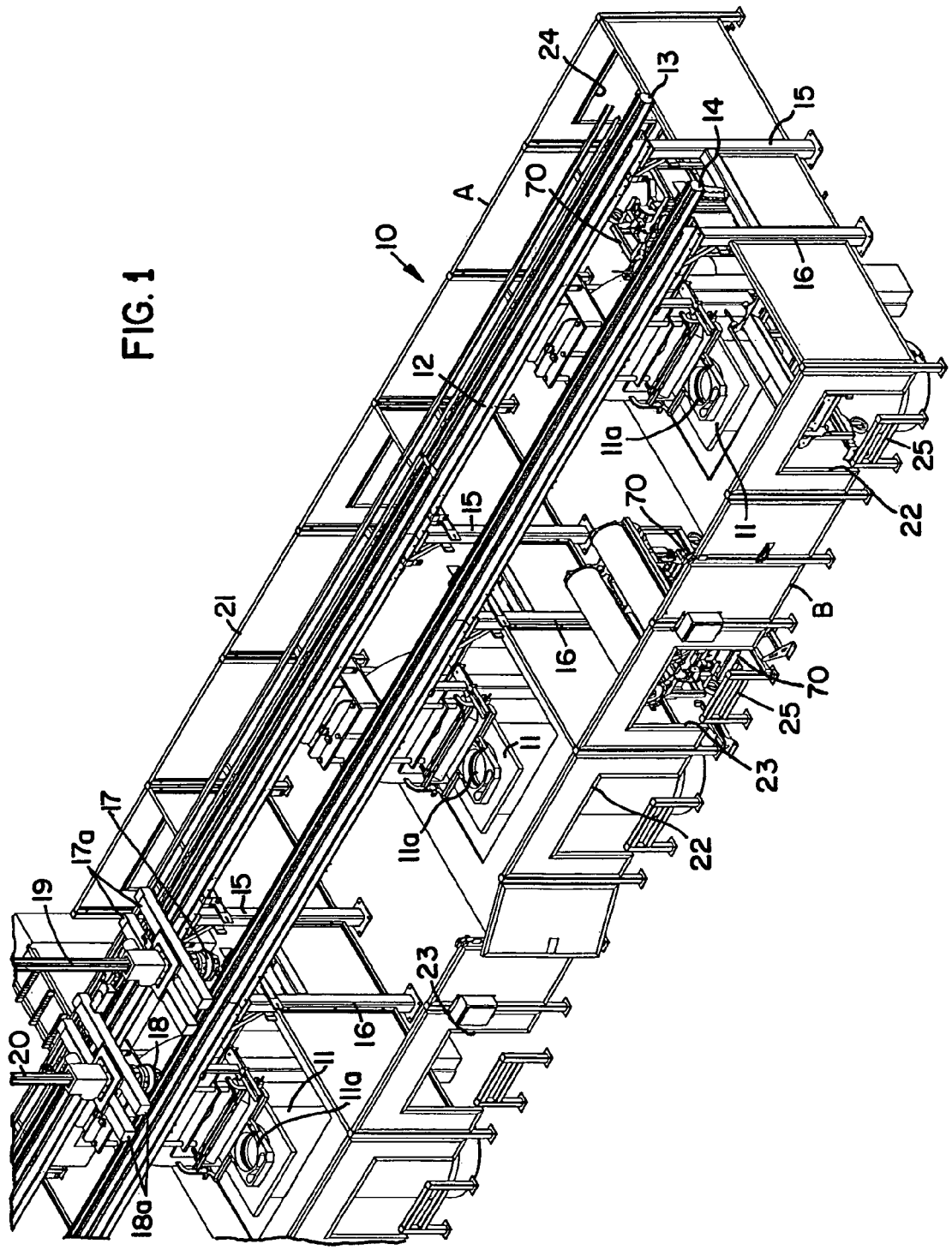
FIG. 1 is a perspective view of the high pressure pasteurization system of the present invention.

Referring to the drawings, where unlike numerals represent like parts throughout the several views, there is generally disclosed at 10 a high pressure pasteurization (HPP) and processing apparatus. The HPP processing apparatus 10 includes a plurality of HPP vessels 11. The HPP processing apparatus 10 includes at least two and preferably more HPP vessels 11. The HPP vessels 11 are well known in the art, and an example of such a vessel is 215L model sold by Avure of Kent, Wash. A gantry assembly 12 includes a first rail 13 and a second rail 14 respectively supported by posts 15 and 16. The gantry supports two robots 17 and 18. The first robot 17 is supported on two mounting members 17a and the second robot 18 is supported on two mounting members 18a. The mounting members 17a and 18a provide for longitudinal movement along the rails 13 and 14. The mounting member 17a also provides for rails so that the robot may move perpendicular to the rails 13 and 14. Throughout this application, the x axis will refer to movement which will be parallel to the rails 13 and 14, the y axis movement parallel to the mounting members 17a and the z axis vertical movement.

The HPP vessels have openings 1a to receive baskets 40. Communications and power to the robots 17 and 18 are provided via wires (not shown). The robots are controlled via a computer (not shown). Suitable robots 17 and 18 may be utilized, one example of which is sold by Parker Hannifin of Irwin, Pa. The robots 17, 18 are also mounted on supports 19, 20. The supports 19, 20 can travel in the z axis direction, thereby moving the robots 17, 18 vertically.

A safety screen 21 may be positioned around the HPP processing apparatus 10. The safety screen 21 has suitable openings to allow access to the HPP processing apparatus 10. The safety screen 21 has two openings 22 and 23 that provide an outlet and opening 24 for an outlet for a cart 60 which holds the baskets 40.

Figure 2:
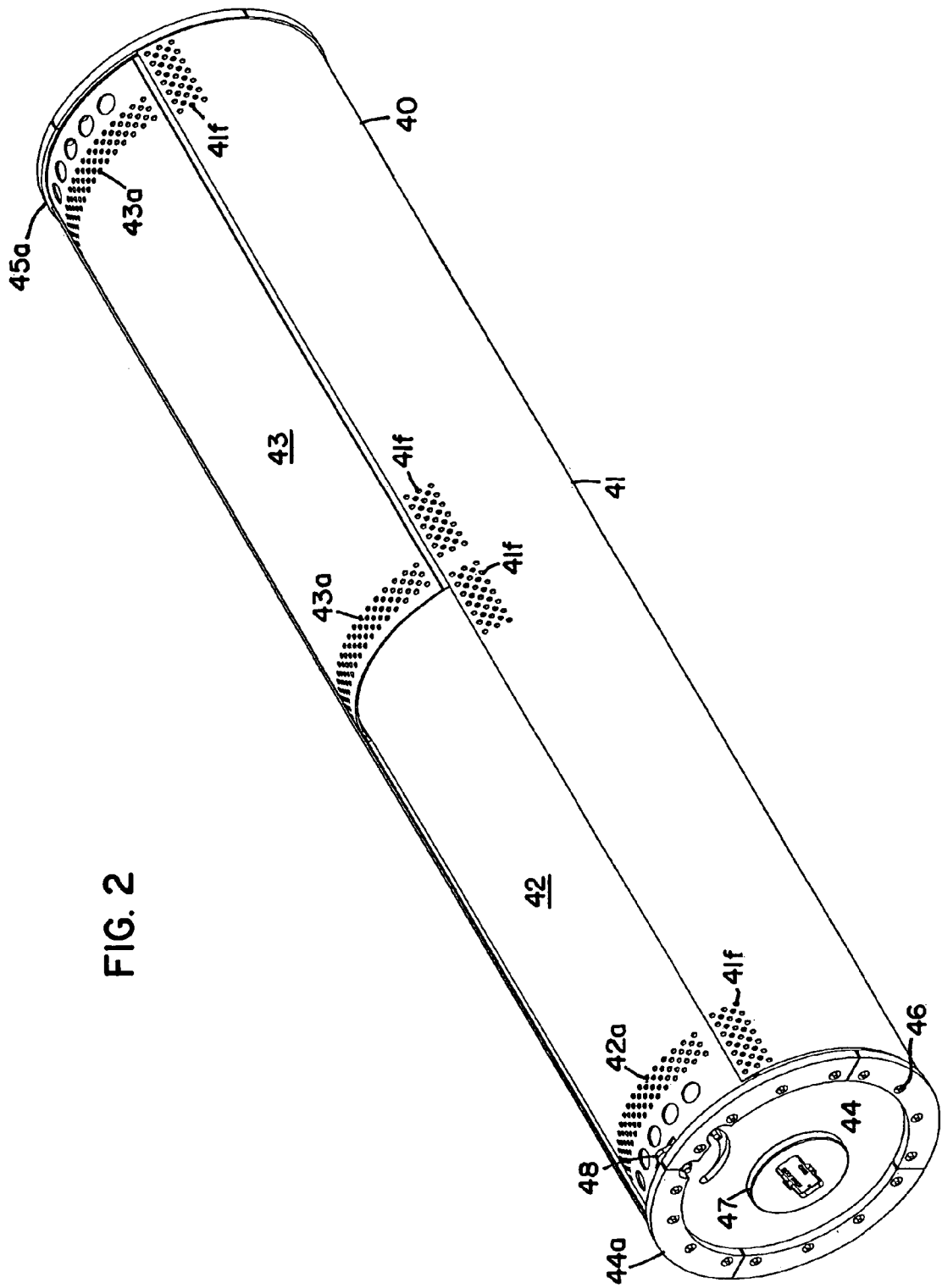
FIG. 2 is a perspective view of a basket for use in the high pressure pasteurization system shown in FIG. 1.
Figure 3:
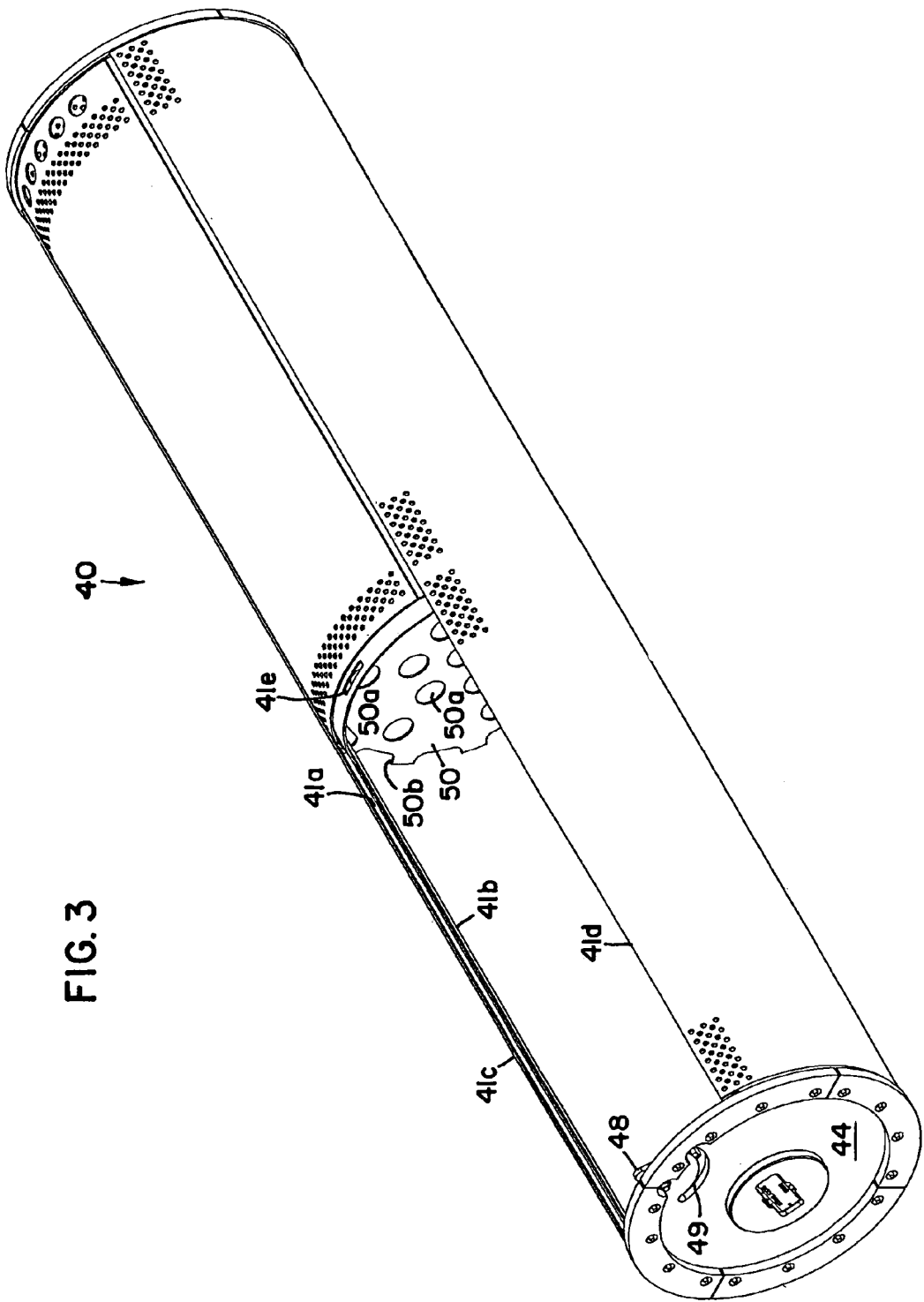
FIG. 3 is a perspective view of the basket shown in FIG. 2 with the door open.

Referring now to FIGS. 2 and 3, there is shown in more detail the basket 40. The basket 40 is shown in a closed position in FIG. 2 and in an open position FIG. 3. The basket is in a general shape of a cylinder. The basket includes a first elongate member 41 and a first cover section 42 and a second cover section 43. The elongate member 41 is operatively connected at a first end to a first end plate 44 and at its other end to a second end plate 45. The elongate member 41 and cover sections 42, 43 and end plates 44, 45 are typically made of stainless steel. A rim 44a and a rim 45a are operatively connected to the end plates 44 and 45 respectively. The rims 44a, 45a are preferably made from an ultra-high molecular weight plastic and are sized to extend beyond the elongate member 41 to prevent scarring when the basket 40 is inserted into the opening 11a. The rims are suitably connected by means such as screws 46 to their respective end plates. Operatively connected to the first end plate 44 is a circular member 47. The circular member 47 functions as a pickup point for the basket 40 when being engaged by the robots 17, 18. A first slot 41a and a second slot 41b are formed in the elongate member 41 proximate a first edge 41c. Similar first and second slots are formed along the second edge 41d. Slots 41a provide for a path for the second cover 43 to slide longitudinally. Similarly, slots 41b provide a path for the first cover section 42 to slide longitudinally. A rectangular opening 41e is formed at the end of the first cover section 42 and provides for an opening to engage a latch 48. The latch 48 has a handle 49 to allow the latch to pivot. The handle 49 is rotated to the left, as viewed in FIG. 3, to lower the latch 48 and allow the cover section 42 to slide adjacent the end plate 44. When the handle 49 is then rotated to the right it engages the latch 48 and holds the first cover section 42 in position. The orientation of the basket 40 is either horizontal or the first end plate 44 is upward. Therefore the second cover section 43 is held in place by gravity against the second end plate 45 when the basket 40 is in an upright position. A partition 50 is circular and is sized and configured to fit inside of the elongate member 41 and is operatively connected thereto by suitable means such as welding. The partition 50 has a plurality of holes 50a. Further, there are openings 50b formed along the inner perimeter of the elongate member 41. Since during the processing of a package in the HPP vessel 11, it is necessary that the water, under pressure, come in contact with product inside of the basket, a plurality of holes are formed in the elongate member 41. Holes 42a are formed in the cover section 42 and holes 43a are formed in the cover section 43. However, in the figures, all of the holes are not shown. The holes 42a and 43a would extend across the sections 42, 43. Further, the holes 41f extend around the complete circumference of the elongate member 41 as well as extending along the horizontal length of the elongate member 41. Such a placement of holes 42a, 43a, and 41f is well known in the art and has not been shown completely for ease of preparation of the drawing.

Figure 4:
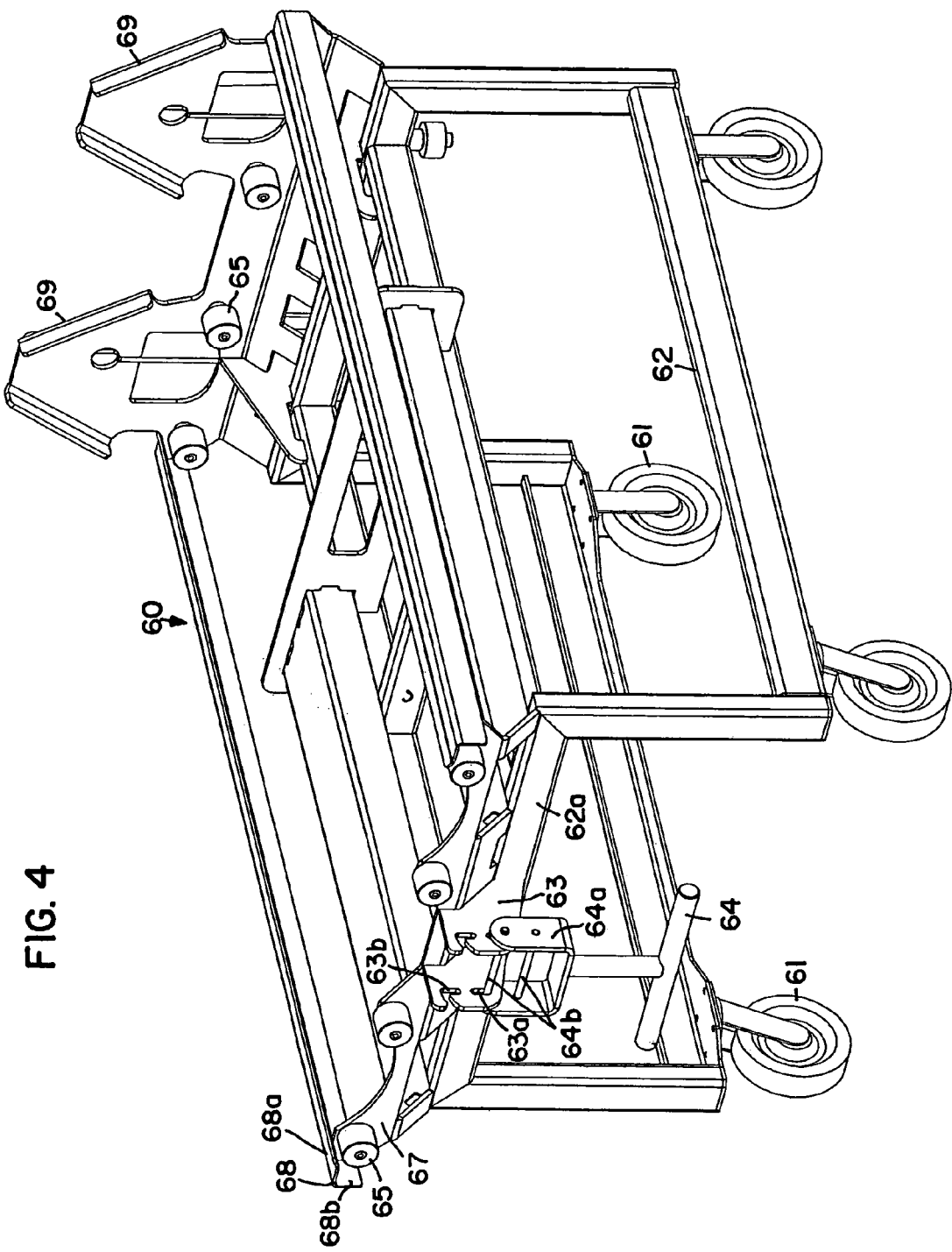
FIG. 4 is a perspective view of a cart used in conjunction with the high pressurization system shown in FIG. 1.
Figure 5:
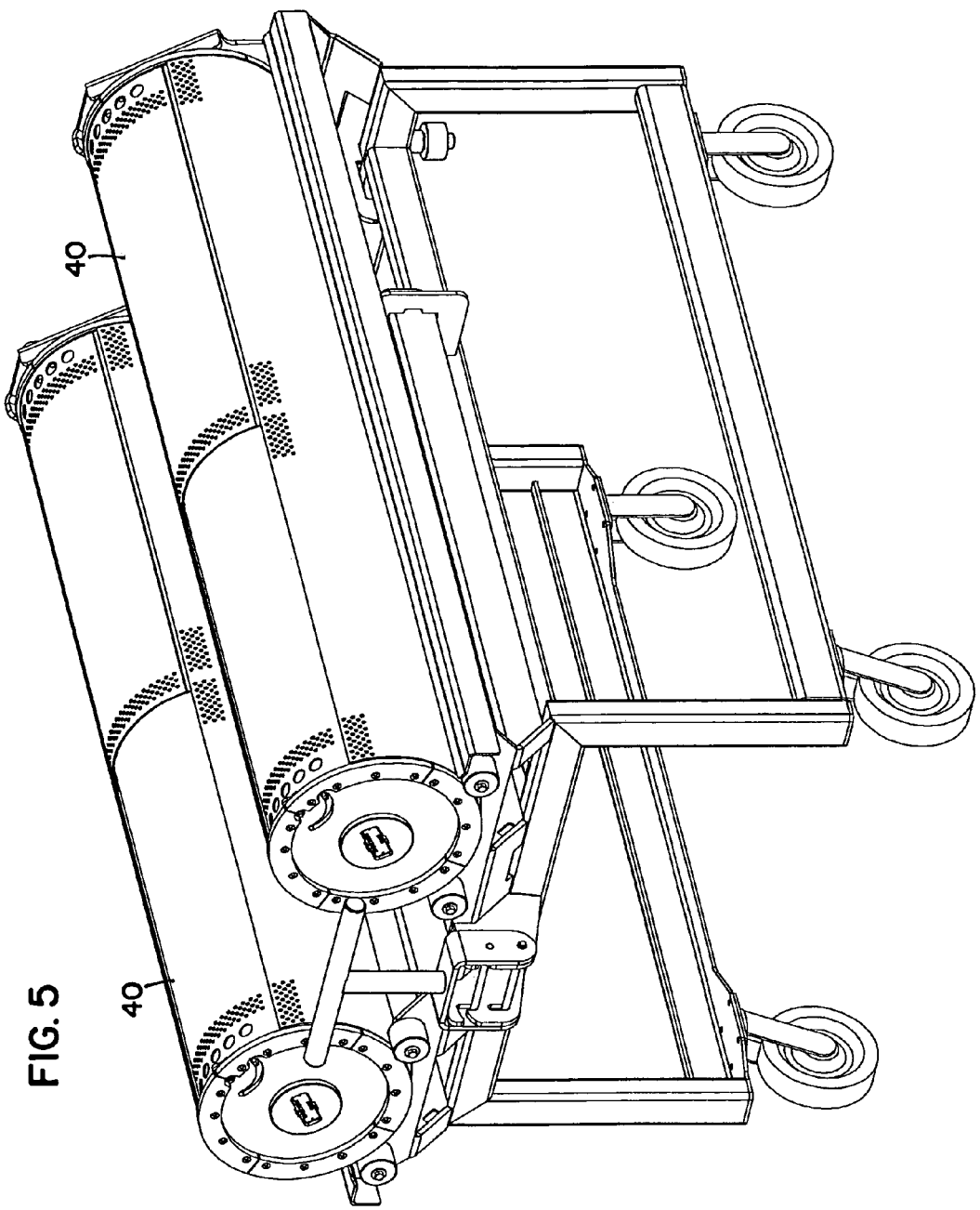
FIG. 5 is a perspective view of the cart shown in FIG. 4 with the baskets shown in FIG. 2 in position on the cart.

Referring now to FIGS. 4 and 5, there is shown a cart 60. The cart 60 has four caster wheels 61 that are operatively connected to and support a frame 62. A yoke 63 is operatively connected to a cross member 62a of the frame 62. A T-handle 64, having an inverted U-shaped base 64a, is operatively connected to the yolk 63. Two pins 64b are operatively connected between the legs of the base 64a and are positioned in slots 63a and 63b formed in the yoke 63. The handle 64 is then moveable from the stored position, as shown in FIGS. 4 and 5 to a transport position by simply lifting up on the handle and pivoting downward about the lower pin 64b.

Eight rollers 65 are rotatably mounted on shafts 66. The shafts are operatively connected, by means well known in the art such as welding, to a support member 67 that is operatively connected to and supported by the frame 62. As shown in FIG. 5, the baskets 40 are supported on the cart 60 by the rims 44a and 45a contacting the rollers 65. The baskets 40 are then able to be rotated on the rollers 65. An L-shaped cover or shield 68 extends substantially the length of the cart and is positioned so as to be adjacent the rims 44a and 45a as well as the elongate member 41. The cover 68 has a horizontal section 68a and a vertical section 68b. The cart 60 has two bottom members 69 upon which the baskets 40 rest, when the cart 60 is moved to a vertical position.

Figure 6:
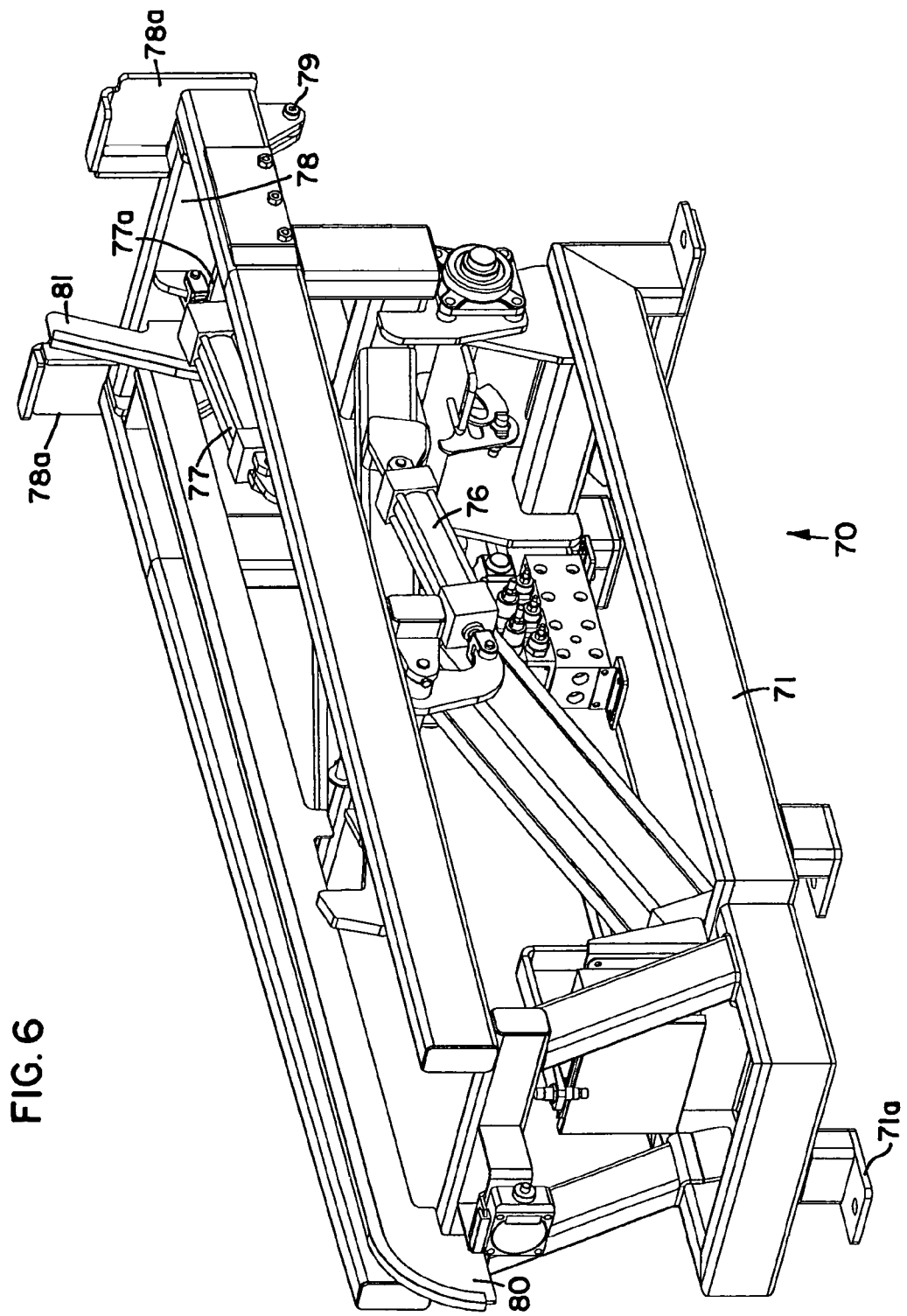
FIG. 6 is a perspective view of a lifting mechanism utilized in orienting the cart while use in the high pressure pasteurization system.
Figure 7:
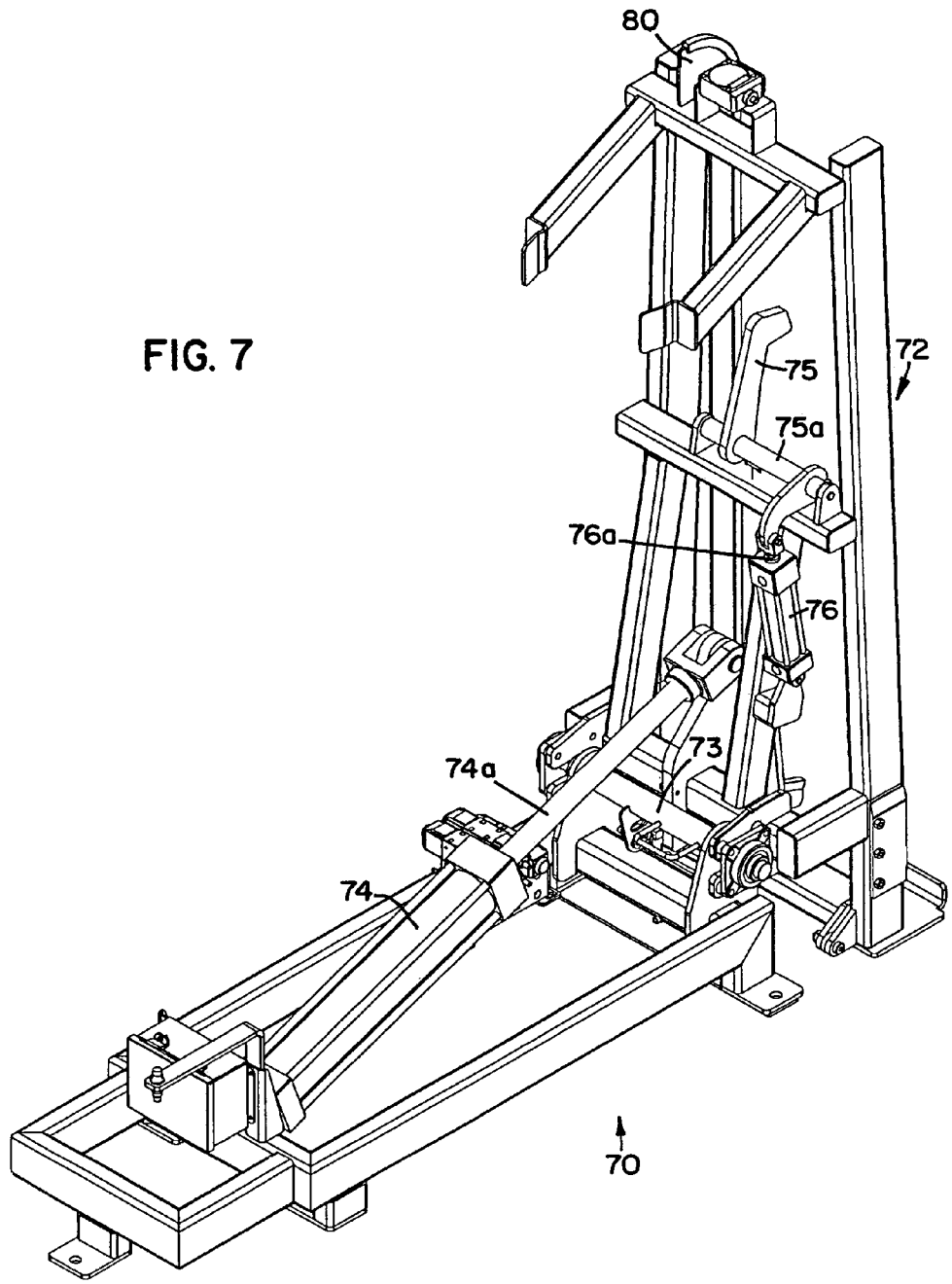
FIG. 7 is a perspective view of the lifting mechanism shown in FIG. 6 in an extended position.

Referring now to FIGS. 1, 6 and 7, two tilting mechanisms 70 are positioned in each of the cells of the HPP processing apparatus 10, one on the unprocessed side A and another on the processed side B. The tilting mechanisms 70 are only shown in the first cell, but it is understood they would also be in each of the other cells. It is appreciated that any suitable tilting mechanism may be used to change the orientation of the baskets 40 from horizontal to vertical and then from vertical to horizontal. The tilting mechanism 70 includes a base frame 71 that is suitably secured to the floor or mounting surface by bracket 71a and bolts (not shown). A moveable frame 72 is rotatably mounted on a pivot bar 73 by means well known in the art. A cylinder 74 has an extension arm 74a, that when extended, will rotate the frame 72 to an upright position as shown in FIG. 7. A latch member 75 is pivotally mounted on bar 75a. A second cylinder 76 has an extension arm 76a, that when extended, will cause the bar 75a to rotate and thereby cause the latch mechanism to rotate and engage and hold the cart 60 against the movable frame 72. Then, when the cylinder arm 74a is extended the latch member 75 will hold the cart 60 in position as the cart rotates from a horizontal position to a vertical position. A third cylinder 77 has an extension arm 77a that is utilized to rotate the cross-member 78 with its two supports 78a from an up position, as shown in FIGS. 6 and 7 to a horizontal position (not shown). The cross member 78a pivots about point 79. When the arm 77a is extended and the cross member 78 rotates 90 degrees to the right, as shown in FIG. 6, the cart 60 is then able to be moved off of the tilt mechanism 70. A handle guide 80 extends the length of the moveable frame 72. A second handle guide 81 is secured to the cross member 78, so that when the cross member 78 rotates 90 degrees to the right, the handle guide 81 is parallel to the handle guide 80. The handle guides 80 and 81 prevent the T-handle 64 from falling down in between the movable frame 72 as the cart is being pushed off of the tilting mechanism 70. The cylinders 74, 76 and 77 may be operated by suitable computer controls or manually.

The operation of loading the baskets 40, processing the baskets 40 in the HPP vessels 11 and the unloading of the baskets 40 will now be described in more detail.

Figure 8:
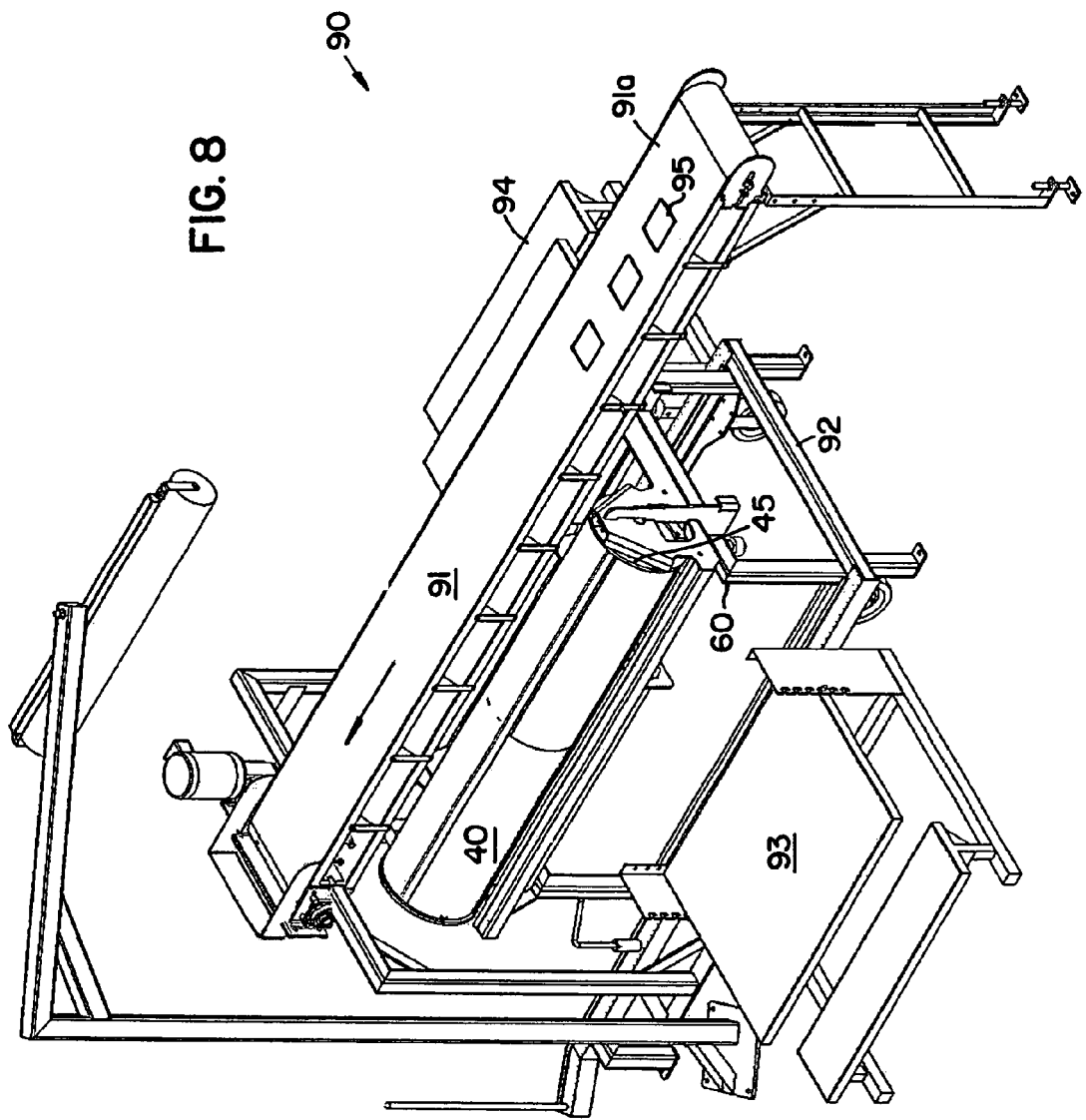
FIG. 8 is a perspective view of a loading station.

Referring now to FIG. 8, there is shown a loading station generally designated at 90. The loading station includes a conveyor 91 for receiving a food package 95 at its first end 91a. The food package 95 may be supplied to the conveyor 91 by any suitable means well known in the art. The food package includes a product that is any suitable food product in a suitable package. The packages typically wrap the food in a suitable plastic. Such food packages 95 are well known are in the art. A cart 60, with two baskets 40, is positioned into a guide/stop 92. The conveyor 91 is positioned between the two baskets 40 and the second basket is hidden from view in FIG. 8. There are two optional platforms 93 and 94 that provide steps for the workers to stand next to the respective baskets 40. In order to load the basket 40, one of the two cover sections 42, 43 is moved to an open position, such as shown in FIG. 3. The worker is then able to pull the food packages 95 from the conveyor 91 into the interior of the basket 40. Once one section is filled, the covers are moved to the opposite direction and the second section is filled. The rollers 65 allow the worker to rotate the basket so that the edge 41c or 41d is below the height as the conveyor 91. The edge 41c or 41d may easily be oriented to the height desired by the worker. The worker is able to load the basket 40 by having a pulling motion, which is ergonomically better than a pushing motion. Once both sections of both baskets 40 are loaded, the cover sections 42, 43 are closed and latched and the cart 60 is removed from the guide 82 and another cart 60 is brought in for loading. The partition 50 provides for an intermediate load-bearing member so that later in the process when the baskets are vertical, the bottom food package only has the weight of one-half of the food packages in the basket 40. It is of course understood that more partitions 50 could also be used to further limit the weight on the bottom packages.

The food packages 95 are loaded in a horizontal position and are transported from the loading station 90 to the HPP processing apparatus 10 while still in the horizontal position.

The processing through the HPP processing apparatus 10 will now be described. Carts 60 with baskets 40 full of unprocessed food packages 95 are brought to the "unprocessed" side A of the HPP processing apparatus 10. The "processed" side B is the side where the carts 60 are removed after the food packages 95 in the baskets 40 have been processed. By having an unprocessed side and a processed side, the potential for inadvertently treating an unprocessed basket 40 as processed is eliminated. The cart 60 is brought into the opening 24 with the baskets 40 still in a horizontal position. A tilting mechanism 70 is positioned to receive the cart 60 after it is passed through the opening 24. The tilting mechanism 70 is then activated and the latch mechanism 75 secures the cart 60 to the tilt mechanism 70 and moves the cart 60 and baskets 40, for the first time, to a vertical orientation. One of the robots 17, 18 then is oriented along the x axis and y axis over the circular member 47 of the basket 40. The robot 17, 18 is lowered and the robot 17, 18 grasps the circular member 47. The robot 17, 18 then lifts the basket 40 upwards and moves it along the x axis and y axis over the opening 11a where the robot 17, 18 then lowers the basket 40 into the HPP vessel 11 through the opening 11a. The rims 44a and 45a help prevent any scratching of the HPP vessel 11. The HPP vessel 11 then goes through its cycle to process the food packages 95 inside of the basket 40. After the cycle is completed one of the robots 17, 18 will again be positioned over the opening 11a and go downwards and grasp the circular member 47a in order to lift the basket 40 out of the HPP vessel 11. The robot 17, 18 will then move the basket 40 to the second tilting mechanism 70 positioned on the process side B. The tilting mechanism 70 and cart 60 are oriented vertically. When two baskets 40 are on the cart 60, the tilting mechanism 70 is returned to horizontal and the cart 40, with two processed baskets 60, are pushed off of the tilting mechanism 70 through opening 23. While this unloading of the basket 40 from the HPP vessel 11 is occurring using one of the robots 17, 18, the other of the robots 17, 18 is simultaneously picking up another basket 40 from the unprocessed side A and is placing it in the HPP vessel 11. By using two robots to perform the unloading and loading function simultaneously, the HPP vessel 11 is able to be more fully utilized a greater percentage of the time. The cycle time of the HPP vessel 11 is reduced. When both baskets on the cart 60 from the unprocessed side are processed, the tilting mechanism 70 is returned to horizontal along with the cart 60 is pushed off of the tilting mechanism and the empty cart 60 is moved out of opening 22. As an example, a vessel may have a cycle time of approximately seven minutes. This will of course depend upon the product being processed as well as the performance of the vessel. The time to load and unload a vessel using only one robot would be approximately one minute and seven seconds, whereas using the present invention of two robots to load and unload a basket at the same time the load and unload time is reduced to 36 seconds. It is understood that depending on each HPP and processing apparatus that may be utilized, these times may vary.

Once the carts 60 on the processing side B are full, the tilting mechanism 70 is used to lower the carts 60 back the horizontal position. The carts 60 are then removed through the openings 22 and 23. The small fence 25 is designed to warn workers from entering the openings 22, 23, but still allow the carts 60 to pass over.

The two robots 17 and 18 are able to supply baskets 40 to multiple HPP vessels 11. It is understood that any suitable programming may be used to provide for the proper sequencing just described.

Figure 9:
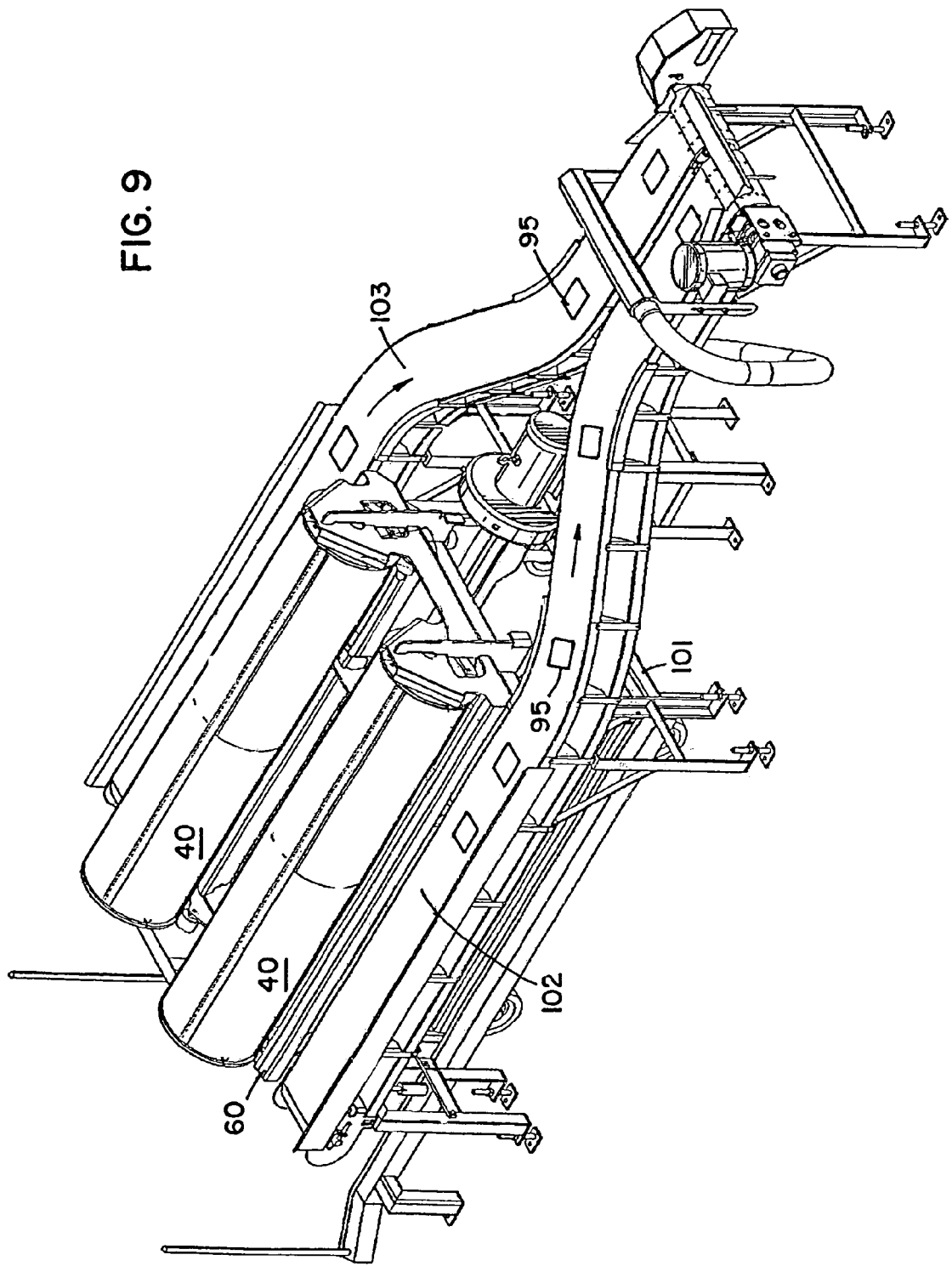
FIG. 9 is a perspective view of an unloading station.

Once the food packages 95 are processed and removed from the process side B of the HPP processing apparatus, they are moved by the cart, while still in a horizontal position, to the unloading station, shown in FIG. 9. Referring to FIG. 9, there is shown generally an unloading station 100. As viewed in FIG. 9, a cart 60, having two baskets 40, is brought in from the left up to when the cart 60 contacts a guide/stop 101. Two conveyors 102 and 103 are adjacent the baskets 40. A worker, standing next to the conveyor 102 or 103, then opens the sections 42 and 43 sequentially and removes the food packages 95 inside of the basket 40. Again, the worker may rotate the basket 40, on their circular rims 41a, 41b, on the cart so as to align the first edge 41c or 41d even with the height on the conveyor. The worker is able to unload the basket 40 by having a pulling motion, which is ergonomically better than a pushing motion. The packages 95 then proceed down the conveyors 102-103 for further packaging, by means well known in the art. After the baskets 40 have both been unloaded, the cart 60 is removed and another cart with full baskets 40 is provided.

By keeping the baskets 40 in a horizontal position throughout, except for the one time where the baskets are moved to a vertical position, to allow for insertion into the HPP vessel 11, the amount of stress on the food package 95 is minimized, thereby lessening the chances of puncturing or tearing the food package 95.

The invention has described the capabilities of using a system that includes two robots 17 and 18. It is understood that by suitable programming, the system may also be set up to utilize only one robot in the event of the failure of the other robot. This would of course reduce the turnaround time, but still allows for the operation of the processing apparatus 10 when one robot has failed, or is being serviced.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of processing a product for processing in a high pressure pasteurization vessel in a high pressure pasteurization and processing apparatus, the method:
    a) positioning an elongate cylindrical basket on a moveable cart, the basket in a horizontal position;
    b) loading product inside of the basket while the basket is on the moveable cart and is still in the horizontal position;
    c) moving the cart and basket, while the basket is still in the horizontal position to the high pressure pasteurization and processing apparatus;
    d) orienting the basket vertically;
    e) loading the basket into the high pressure pasteurization vessel and subjecting the product to high pressure pasteurization;
    f) removing the basket from the high pressure pasteurization vessel;
    g) orienting the basket horizontally;
    h) moving the cart and basket, while the basket is still in the horizontal position to an unloading station; and
    i) unloading the product from the basket, while the basket is still in the horizontal position.

2. The method of claim 1, further comprising after removing the basket from the high pressure pasteurization vessel, placing the basket on the cart in a vertical position and then orienting the cart, with the basket, horizontally.

3. The method of claim 2, further comprising:
    a) moving the basket to a vertical position just prior to loading the basket in the high pressure pasteurization vessel; and
    b) loading the basket into the high pressure pasteurization vessel while the basket is still in the vertical position.

4. The method of claim 1, further comprising the basket having a door for access into a cavity in the basket in which the product is placed and during loading positioning the cart and basket proximate a conveyor, such that the conveyor, with product to be loaded, is between the basket and operator.

5. The method of claim 4, further comprising rotating the basket along its horizontal axis so that when the door is open, a bottom of an opening covered by the door is proximate a same level of the conveyor to facilitate loading.

6. The method of claim 5, further comprising during unloading of the product after high pressure pasteurization a second conveyor is positioned between the operator and the basket.

7. The method of claim 6, further comprising rotating the basket along its horizontal axis so that when the door is open, the bottom of the opening covered by the door is proximate a same level of the conveyor to facilitate unloading.

* * * * *